Sept. 12, 1961   E. HELLINGMAN ET AL   2,999,364
METHOD AND DEVICES FOR SEPARATING COMPONENTS
FROM A GAS-AND/OR VAPOUR MIXTURE
Filed July 18, 1958   2 Sheets-Sheet 1

INVENTORS
EVERT HELLINGMAN
CORNELIS JACOBUS MARIA VAN DER LAAN
KLAAS ROOZENDAAL
BY
AGENT

INVENTORS
EVERT HELLINGMAN
CORNELIS JACOBUS MARIA VAN DER LAAN
KLAAS ROOZENDAAL
BY
AGENT

2,999,364
METHOD AND DEVICES FOR SEPARATING COMPONENTS FROM A GAS- AND/OR VAPOUR MIXTURE

Evert Hellingman, Cornelis Jacobus Marie van der Laan, and Klaas Roozendaal, all of Eindhoven, Netherlands, assignors to North American Philips Company, Inc., New York, N.Y., a corporation of Delaware
Filed July 18, 1958, Ser. No. 749,509
Claims priority, application Netherlands July 26, 1957
4 Claims. (Cl. 62—6)

The present invention relates to methods and devices for separating components from a gas and/or vapour mixture by cooling.

It has already been known to separate a component from a gas and/or vapour mixture, for example moisture from the air, by passing the mixture over a number of vertically extending walls in which a given temperature gradient is maintained by cooling.

The required wall surface is comparatively large. Removal of the snow deposited on the wall and often partially having the character of ice is rather time-consuming.

The present invention has for its object to provide a device for separating fractions, for example water and carbonic acid from the air, which has a simple construction and is fairly compact, while the snow deposit is readily removable.

The fractionating device according to the invention permits a considerable operation period of the machine or system, for example a gas-fractionating system, in which the separator is employed.

In accordance with the invention, a layer of gas and/or vapour-passing snow is built up, while separation of the components, for example water and carbonic acid, is effected by passing the mixture of gas and/or vapour through said layer of snow.

The snow may be formed by one or more of the components themselves. Alternatively, however, snow may first be formed, for example from water vapour, and serve to collect another component, for example carbonic acid.

It is surprising to find that, when proceeding according to the invention, snow can be trapped, as it were, with snow. The layer of snow built up increases on passing the mixture to be treated through it against the direction of flow of the air and fresh snow deposits on the previous snow in a form allowing the passage of gas.

The snow deposit is found to result from the fact that the heat flow through the mass of snow itself is sufficient to maintain the outside at a low temperature, thus creating a temperature gradient in the layer of snow itself.

It is to be noted that the term "snow" is to be taken in a wide sense. Thus, for example, sulphur may be separated from a vapour by passing this vapour through a layer of "sulphur snow," in which layer a temperature gradient must then be present according to the invention. In the present case, however, the temperature of the "snow" is not below zero.

During operation, the layer of snow built up continuously remains in good condition as a filter for the fractions to be separated, for example water and carbonic acid. It is found that, during operation, the layer of snow may become very thick, for example 7 cms. and more without involving a high flow resistance.

The layer of gas-passing snow essential to the invention may be formed on a cooled wall which should also permit the passage of gas or vapour.

In the present case, porous walls or walls consisting of sieve material enter into account. The sieve material may have round or slit-shaped meshes.

Excellent results are obtained with walls entirely or partly consisting of metal gauze. Copper gauze has been found to be particularly suitable, since it permits a very even temperature to be obtained throughout the surface of the gauze.

The layer of snow formed on such gauze is easily removable, even by means of a simple scraper. The gauze need not be fine-meshed. The apertures in the wall may, for example, have a minimum dimension of from 0.1 to 5 mms., preferably 0.4 to 2 mms.

The wall(s) should be maintained at a comparatively low temperature. In one embodiment of the invention, the wall is maintained at a temperature zero or a number of degrees lower than that corresponding to the permissible vapour tension of the component frozen out at the lowest temperature.

In order to separate carbonic acid well-nigh completely, a wall temperature of approximately $-165°$ C. is advisable. For separating water, a temperature of, say, $-50°$ C. is sufficient, while the separation, for example of acetylene, requires still lower temperatures, say $-180°$ C.

Several walls, for example gauzes, may be placed one behind the other in the current of gas so that, for example, the first wall mainly serves for separating water, the next one for separating $CO_2$ and, if desired, a third wall for separating acetylene.

Maximum separation of these components is very important, particularly in gas-fractionating systems, in order to prevent obstruction of the filling of the fractionating column as well as fire and explosion risk. Alternatively, several components, for example water and carbonic acid, may be trapped on a single wall, for example gauze, provided the temperature be chosen adequately.

In order to obtain a loose, porous snow structure, the rate of flow of the supplied gas current is preferably maintained at a value amounting at most to 10 cm./sec. The term "rate of flow" is to be understood to mean the speed of the gas near the location of the gauze, if the gauze is thought to be removed. The required wall (gauze) surface being calculated from this rate and the quantity of gas.

The wall(s) on which the layer of snow deposits can be continuously cooled in many different ways.

In one form of the invention, the wall is conductively connected to conductive strips, ribs, rods or tubes adapted to be cooled. They are secured, for example through a heat-conductive member such as a copper plate, to a cold member, for example the head of a gas refrigerator, that is to say a machine operating according to the reversed hot-gas principle.

As a further alternative, the separator may be a self-contained removable unit and in this case cooling may be effected by placing the wall(s) partially in a collecting member, for example a trough for liquid gas.

As a still further alternative, the wall(s) of the separator may be provided around or against a boiler of a gas-fractionating column, for example about or against circulation vapour pipes of such a boiler.

Finally, the novel separator may be used with advantage in refrigerators for very low temperatures designed for circulation of a cold gas.

In these uses, also, the snow layer is an effective filter for the newly formed snow which forms invariably, for example when opening such refrigerators.

The desired layer of snow is formed on the gauze by passing moist air through the gauze. After some time a layer of snow forms by which all the snow is collected.

The required surface of the gauze need not be extremely large.

In order that the invention may be readily carried into effect, examples will now be described in detail with reference to the accompanying drawing, in which—

Figure 6:
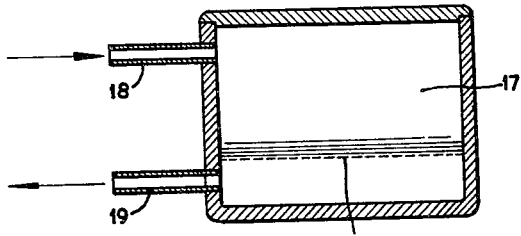

A refrigeration chamber is shown diagrammatically in FIG. 6.

Figure 1:
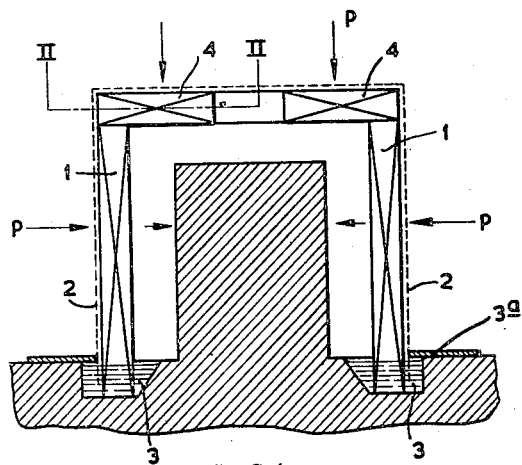
FIG. 1 is a longitudinal section of a self-contained gas separator which is cooled by means of liquid gas in a trough.
Figure 2:
FIG. 2 is a sectional view of a detail on the line II—II of FIG. 1.

In FIGS. 1 and 2, a cage is formed by radial copper strips 1 placed on edge and flat strips 4, which strips are surrounded by gauze or perforated wall 2 secured by soldering.

The assembly is placed in a trough 3, for example filled with liquid air. The wall 3a should adjoin the gauze 2.

The direction of flow of the gas to be treated is from the outside to the inside (arrows p).

Hence, in FIG. 1, the layer of snow increases externally of the gauze against the direction of the arrows p.

Figure 3:
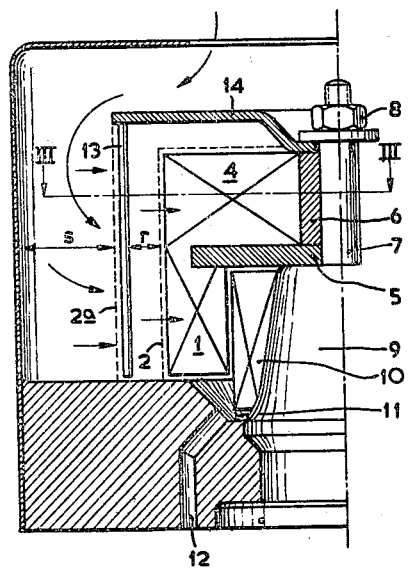
FIG. 3 is a fragmentary longitudinal section of a separator secured to the cold head of a gas refrigerator.
Figure 3A:
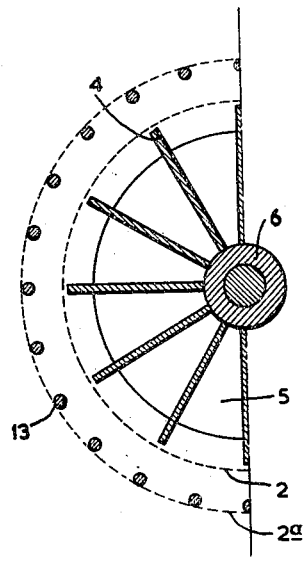
FIG. 3a is a cross-sectional view on the line III—III of FIG. 3.

In FIG. 3, a cage is formed of flat strips 1 and 4 connected to sturdy pieces 5 and 6 of heat-conductive material.

By means of a stud 7 and a nut 8 the plate 5 is secured to the cold head 9 of a gas refrigerator with ribs 10 on which air fed to the head condenses. This liquid air is collected in a trough 11 and carried off, for example, through a pipe 12.

The cage is surrounded by gauze 2.

This gauze is the coldest element and a layer of snow formed on it mainly traps $CO_2$.

The piece of gauze 2a is provided around rods or pipes 13 which are connected through a disc 14 to a bushing 6 and to which cold is supplied from this member.

Snow formed on said gauze 2a chiefly traps water.

If the gauze is soldered to pipes it can be cooled by means of cold liquid or gas flowing through the pipes.

The annular spaces r and s should have a volumetric capacity sufficient for housing the layers of snow.

Figure 4:
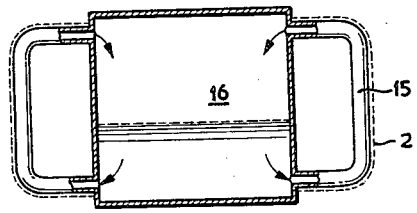
FIGS. 4 and 5 illustrate diagrammatically the use with the boiler of a gas-fractionating column.
Figure 5:
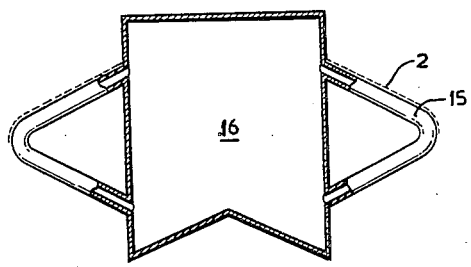

In FIGS. 4 and 5, the gauze 2 is provided around circulation pipes 15 of a boiler 16.

Figure 5A:
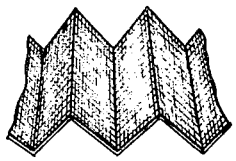
FIG. 5a illustrates a possible form of the gauze shown in FIG. 5.

FIG. 5a shows how the gauze 2 may be folded in zig-zag form.

These constructions require little copper.

FIG. 6 shows a refrigeration chamber 17. Cold air is fed at 18 and carried off at 19. A snow filter forms on the gauze 2.

What is claimed is:

1. A method of separating components from a gas and vapor mixture by cooling, said gas having impurities such as water and carbonic acid; comprising biulding up a layer of snow having a temperature gradient on a gauze wall arranged adjacent to a heat conducting plate, the latter being fixed to a heat exchanger, and passing said gas and vapor mixture through said layer of snow to separate out the water and carbonic acid therefrom, the rate of feeding said gas and vapor mixture being at most 10 cm./sec. for obtaining a porous layer of snow.

2. A method of separating components from a gas and vapor mixture by cooling as claimed in claim 1 wherein said gauze wall is maintained at a temperature which is at least zero degrees and corresponds to the permissible vapor tension of the component frozen out at the lowest temperature.

3. A device for separating components from a gas and vapor mixture by cooling comprising a heat exchanger having a plurality of radial strips, a gauze layer secured to the free ends of said radial strips, a cold gas refrigerator operating on the reversed Sterling cycle connected to said gauze wall through said heat exchanger and forming a cold source therefor whereby a layer of snow is built up on said gauze, said layer of snow permitting the free passage of gas and vapor mixture therethrough while the water and carbon dioxide component thereof is frozen out.

4. A device for separating components from a gas and vapor mixture by cooling comprising a heat exchanger having a plurality of radial strips, a gauze layer secured to the free ends of said radial strips forming a structure surrounding said heat exchanger upon which a layer of snow is built up, a cooling source operatively connected to said gauze wall, said layer of snow permitting the free passage of gas and vapor mixture therethrough while the water and carbon dioxide component is frozen out, said cooling source including a trough located adjacent to said heat exchanger for collecting the liquified gas of said mixture and at least a part of said gauze layer being positioned in said trough in heat exchanging relationship with said liquified gas.

References Cited in the file of this patent

UNITED STATES PATENTS

| | | |
|---|---|---|
| 2,214,672 | Hausen | Sept. 10, 1940 |
| 2,386,297 | Dennis | Oct. 9, 1945 |
| 2,532,288 | Buschow | Dec. 5, 1950 |
| 2,585,912 | Buschow | Feb. 19, 1952 |
| 2,586,207 | Collins | Feb. 19, 1952 |
| 2,648,205 | Hufnagel | Aug. 11, 1953 |
| 2,734,354 | Kohler | Feb. 14, 1956 |
| 2,777,299 | Skaperdas | Jan. 15, 1957 |